United States Patent [19]
Everett

[11] Patent Number: 4,804,815
[45] Date of Patent: Feb. 14, 1989

[54] PROCESS FOR WELDING NICKEL-BASED SUPERALLOYS

[75] Inventor: Mark A. Everett, North Brunswick, N.J.

[73] Assignee: Quantum Laser Corporation, Edison, N.J.

[21] Appl. No.: 60,758

[22] Filed: Jun. 1, 1987

[51] Int. Cl.⁴ .............................................. B23K 26/00
[52] U.S. Cl. .............................. 219/121.6; 219/121.8; 219/121.84; 427/53.1; 427/432
[58] Field of Search ...................... 219/121.65, 121.60, 219/121.84, 121.80, 121.6, 121.85; 427/190, 431, 432, 53.1; 29/402.18

[56] References Cited

U.S. PATENT DOCUMENTS

| | | | |
|---|---|---|---|
| 4,117,302 | 9/1978 | Earle et al. | 219/121 LC X |
| 4,269,868 | 5/1981 | Livsey | 427/191 X |
| 4,299,860 | 11/1981 | Schaefer et al. | 219/121 LE X |
| 4,300,474 | 11/1981 | Livsey | 219/121 LE X |
| 4,323,756 | 4/1982 | Brown et al. | 219/121 LF |
| 4,533,815 | 8/1985 | Ecer | 427/53.1 |
| 4,615,903 | 10/1986 | Miller | 427/53.1 |
| 4,730,093 | 3/1988 | Mehte et al. | 219/121 LE X |

FOREIGN PATENT DOCUMENTS

| | | | |
|---|---|---|---|
| 040092 | 11/1981 | European Pat. Off. | 427/53.1 |
| 0176942 | 4/1986 | European Pat. Off. | 219/121 LF |
| 0112595 | 10/1978 | Japan | 219/121 LE |
| 251282 | 12/1985 | Japan | 427/53.1 |

*Primary Examiner*—C. L. Albritton
*Attorney, Agent, or Firm*—Shlesinger, Arkwright & Garvey

[57] ABSTRACT

A process for preventing crack formation in nickel alloy substrates having a gamma-prime phase includes providing a substrate comprised of a nickel alloy having a gamma-prime phase. A portion of the substrate is irradiated with a laser beam and thereby forms a molten pool of the alloy. A supply of coating particles are dispersed within the pool, the particles are comprised of a nickel alloy having gamma-prime forming constituents. Rapid relative motion between the beam and the pool is effected so that the pool rapidly solidifies and thereby minimizes the formation of gamma-prime therein and adjacent thereto.

20 Claims, 2 Drawing Sheets

PROCESS FOR WELDING NICKEL-BASED SUPERALLOYS

BACKGROUND OF THE INVENTION

Jet engine parts are subject to extremely adverse conditions, such as dramatic temperature changes, constant and/or sudden vibration and the like. The jet engine parts, particularly the moving parts thereof, must be substantially defect free in order to satisfactorily withstand these conditions. Manufacture of the parts is therefore necessarily expensive, in view of the high degree of quality which must be maintained. Should a particular part not conform to the exacting standards specified and required, then it must be discarded or repaired, if possible.

The demands placed upon the jet engine parts has spurred a search for new, stronger and harder materials. One class of materials developed for this purpose is the nickel-based superalloys. These alloys typically contain in excess of 50% by weight nickel, and have varying concentrations of alloying elements to carefully tailor the properties of the resulting matrix. A particular super alloy of interest is Inconel R 713, a precipitation hardenable alloy used in the manufacture of turbine parts. This alloy utilizes aluminum and titanium as alloying elements, and the cast form of the alloy is known as 713C.

A particular problem with the precipitation hardenable alloys, such as Inconel 713, is the inability to weld these materials with a like material for purposes of repair, and the like. Welding, because of the high temperatures involved, has a tendency to cause cracking at the area of the weld site, thereby resulting in destruction of the welded parts. The crack formations is believed to be due to the formation of gamma-prime, a phase of the alloy resulting from the aluminum and titanium addition. Attempts have been made to weld Inconel 713 with other nickel-based alloys, but these other alloys tend not to have the appropriate characteristics required, and this solution is therefore marginal, at best.

From the above, it can be seen that there is a need for a process permitting precipitation hardenable alloys to be welded with other elements of like alloy composition. Such a process would permit parts having relatively minor defects to be repaired, thereby making the manufacturing process more efficient.

The disclosed invention is a process for welding nickel alloy substrates having a gamma-prime phase with a like alloy, typically with an alloying powder. The welding process utilizes the radiation from a laser beam to form a relatively small molten pool of the alloy substrate. The alloying powder is dispersed within the pool. Movement of the beam relative to the pool causes the pool to rapidly solidify. In this way, the cooling pool rapidly falls through the gamma-prime temperature formation range so that little or no additional gamma-prime is formed in the area of the weld site.

OBJECTS AND SUMMARY OF THE INVENTION

The primary object of the disclosed invention is a process permitting a nickel alloy substrate containing gamma prime phase to be welded with a like material having a gamma-prime phase, or gamma-prime forming constituents.

A process for preventing crack formation in nickel alloy substrates having a gamma-prime phase comprises providing a substrate to be treated, the substrate comprising a nickel alloy having a gamma-prime phase. A portion of the substrate is irradiated with a laser beam and causes a relatively small molten pool of the alloy to be formed. A supply of coating particles are dispersed within the pool, the particles comprising a nickel alloy. Rapid relative motion between the beam and the pool is effected so that the pool rapidly solidifies and thereby minimizes the formation of gamma-prime therein and adjacent thereto.

These and other objects and advantages of the invention will be readily apparent in view of the following description and drawings of the above described invention.

DESCRIPTION OF THE DRAWINGS

The above and other objects and advantages and novel features of the present invention will become apparent from the following detailed description of the preferred embodiment of the invention illustrated in the accompanying drawings, wherein.

DESCRIPTION OF THE INVENTION

A number of morphological forms of gamma-prime have been identified, these depending upon the stoichiometry and the thermal and mechanical history of the particular alloy. The heavily allowed cast superalloys, such as Inconel 713, exhibit three different types of gamma-prime. One type has blossom-like eutectic formations comprising gamma and gamma-prime which are formed directly upon cooling of the melt. A second type is the coarse and somewhat blocky form which is formed directly upon solidification and cooling. The morphological appearance of this type in Inconel 713 is of angular shape, and in large amounts. The third type is the "second generation" gamma-prime. This type is interspersed between the larger blocky gamma-prime particles, and is believed to be primarily responsible for weld cracking. The second generation type is formed after the general precipitation of the previous two types during cooling to room temperature. The second generation probably forms at a temperature of about 1500° F.–1800° F., and can be found in small amounts in all such alloys.

The concentrations of aluminum and titanium effect the amount and the morphology of the gamma prime which is produced. Increasing the level of the aluminum and titanium concentration increases the instability of the alloy. Likewise, a chromium content of 10% shifts the gamma-prime eutectic toward higher aluminum and titanium concentration levels. Furthermore, the increased chrome content decreases the coarseness of the precipitate, increases the microstructural instability, lowers the gamma-prime solution temperature and improves the high temperature rupture properties.

Gamma-prime formation and its temperature of formation vary greatly from alloy to alloy. As a general rule, the higher the aluminum and titanium concentration, then the greater the amount of gamma-prime formed, as well as the higher the temperature required for gamma-prime stability.

The cast superalloys have massive primary gamma-prime structures, including the coarse somewhat blocky type of intragranular gamma-prime. The small, spherical second generation gamma-prime is generally found during cooling.

Inability to solution the gamma-prime before excessive grain growth or liquation occurs has heretofore severely limited subsequent heat treatment of the cast alloy. Aging treatments have relatively little effect on the various gamma-prime types at a temperature of less than 1800° F. Above this temperature, however, the second generation gamma-prime resolutions and the blocky gamma-prime begins to agglomerate and to resolution.

Figure 1:
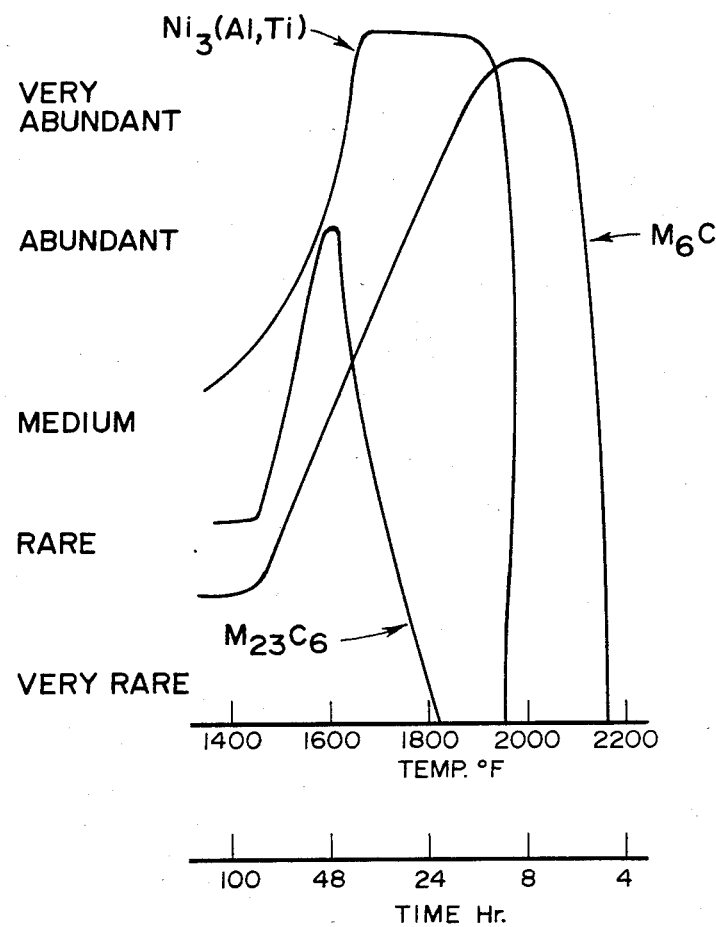
FIG. 1 is a graph illustrating the time and temperature relationship for gamma-prime formation; and, FIG. 2 is a fragmentary cross-sectional view illustrating an apparatus for performing the process of the invention.

FIG. 1 discloses the relative concentration of gamma-prime with reference to temperature and time. It can be seen that gamma-prime forms relatively quickly once the temperature of formation has been achieved. The rapid precipitation of the gamma-prime from the initial nickel-aluminum-titanium molten matrix must be carefully controlled for the resulting cast alloy to have the desired properties.

Table I illustrates the nominal chemical compositions of Inconel 713 and Inconel 625. Those skilled in the art will understand that those alloys are manufactured by a particular source, and that corresponding alloys can be obtained from other manufacturers under the UNS Numbers NO7713 and NO6625, respectively.

TABLE I

| Trade Name | Inconel 625 | | Inconel 713 |
| UNS Number | N06625 | | N07713 |
| --- | --- | --- | --- |
| Al | 0.40 max | Al | 5.5–6.5 |
| C | 0.10 max | B | 0.005–0.015 |
| Cb | 3.15–4.15 | C | 0.08–0.20 |
| Cr | 20.0–23.0 | Cb | 1.8–2.8 |
| Fe | 5.0 max | Cr | 12.00–14.00 |
| Mn | 0.50 max | Fe | 2.50 max |
| Mo | 8.0–10.0 | Mn | 0.25 max |
| Ni | 59.92–68.85 | Mo | 3.8–5.2 |
| P | 0.015 max | Ni | 66.885–76.265 |
| S | 0.015 max | Si | 0.50 max |
| Si | 0.05 max | Ti | 0.5–1.0 |
| Ti | 0.40 max | Zr | 0.05–0.15 |

It can be seen that Inconel 713 has a possible aluminum plus titanium concentration of from about 6% by weight to about 7.5%. Inconel 625, on the other hand, has gamma prime forming constituents, namely aluminum plus titanium, in a concentration of no more than 0.80% by weight.

As noted, the welding of a nickel alloy substrate having a gamma prime phase, or having gamma prime forming constituents, is frequently accompanied by weld cracking or subsequent post treatment cracking. The important phase, from a strengthening and welding standpoint, of Inconel 713 is the face centered cubic gamma prime phase that is based upon the composition $Ni_3(Al, Ti)$. Because of the presence of the gamma prime phase, the alloy tends to be susceptible to hot cracking (weld cracking) and postweld heat treatment cracking, PWHT (strain age or delay) cracking. The susceptibility to hot cracking is directly related to the aluminum and titanium contents (gamma-prime formers). Hot cracking occurs in the weld heat-affected zone; in other words, in that area which is subject to the high temperatures used in the weld process.

Inconel 713 is a precipitation hardenable nickel-based alloy. This alloy is strengthened by controlled precipitation of a second phase, known as the gamma-prime phase, from a supersaturated solid solution. For some precipitation hardenable alloys, precipitation occurs upon reheating of a solution-treated and quenched alloy to an appropriate temperature for a specific time. However, for Inconel 713 and some other like cast alloys, aging occurs directly as the solidified casting cools in the mold.

Microstructures of these alloys, having an aluminum plus titanium concentration of from about 5.5% to about 7.0%, disclose similar structures having scattered eutectic gamma-prime particles plus a fine precipitate. When the concentration increases to the order of 10.5%, then the microstructure contains a number of eutectic gamma-prime particles plus a course gamma-prime precipitate. The concentration of the gamma-prime formers plus the type of gamma-prime formed is therefore an important concentration when considering the weldment of these alloys.

The temperature range in which gamma-prime precipitation occurs also happens to be the temperature at which stress relief occurs. The welding caused precipitation of gamma-prime strengthens the alloy, while the alloy is simultaneously attempting to stress relief. Strengthening is accompanied by a reduction in ductility. The combination of the inability of the part to stress relief, coupled with the gain in strength and lost ductility are among the factors believed to be responsible for post weld heat treatment cracking. Cracking, as is known to those skilled in the art, is a strong function of the hardener content (aluminum plus titanium) of the alloy. During welding, some portion of the heat-affected zone (weld site and adjacent area) is heated into the aging temperature range. As the metal within the heat-affected zone solidifies, then the aging metal may form gamma-prime and become subjected to welding stresses. The combination of welding stresses and increased concentration of gamma-prime is thought to be a cause of hot cracking in the heat-affected zone of the alloy.

Figure 2:
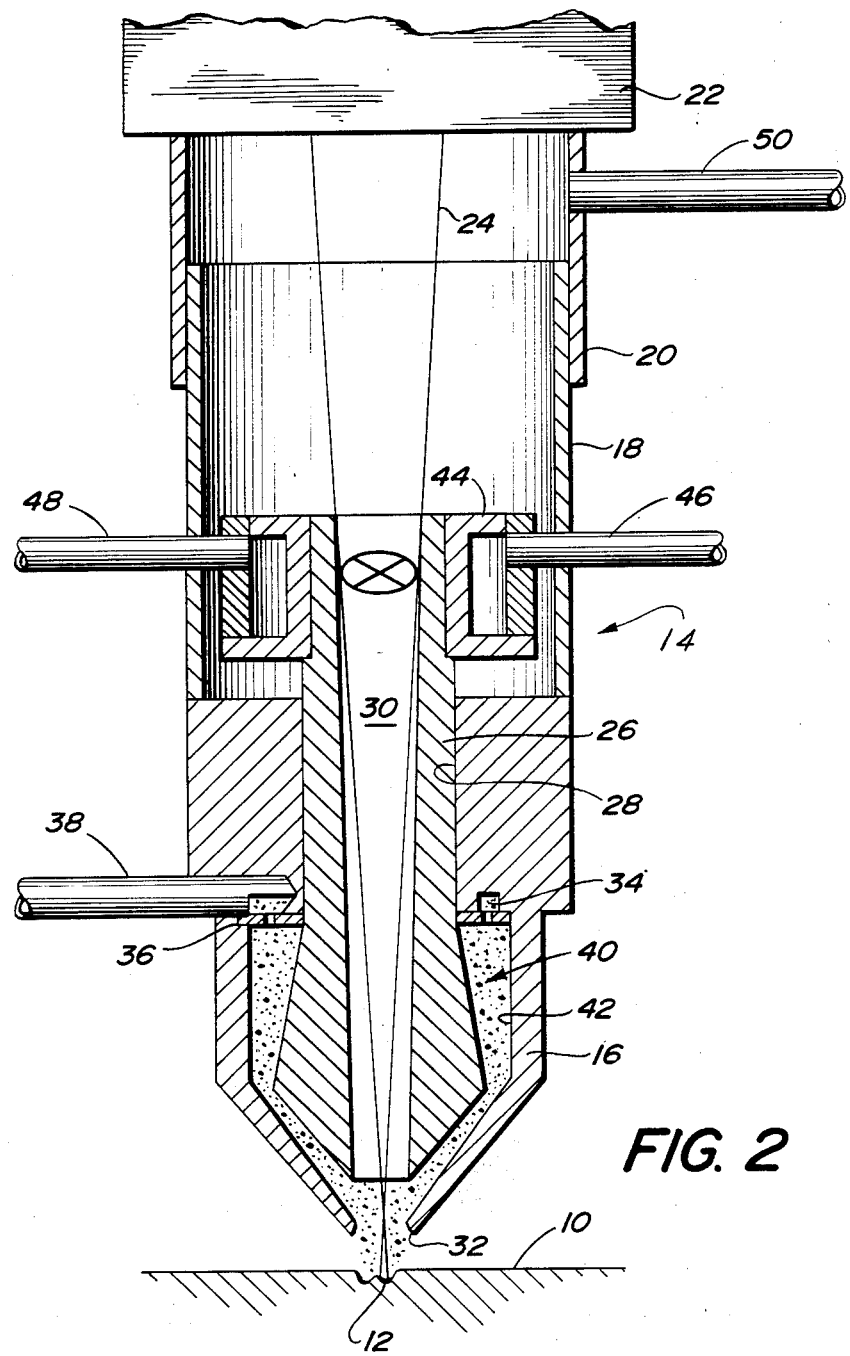

FIG. 2 discloses an apparatus for practicing the laser cladding or welding of the invention. The substrate 10, as best shown in FIG. 2, is comprised of a nickel-based alloy having a gamma-prime phase, preferably including Inconel 713C. The substrate 10 has a surface defect 12 which must be repaired. As previously noted, Inconel 625 alloy may be used for repair, although this alloy may not have the appropriate properties. A better repair process involves laser cladding with Inconel 713, so that the properties are essentially unchanged.

Toward the above end, a laser nozzle 14 is positioned proximate the substrate 10 in the area of defect 12. The nozzle 14 is, preferably, of the type disclosed in application Ser. No. 038,879, filed Apr. 15, 1987, in the name Albert W. Hammeke for LASER SPRAY NOZZLE AND METHOD, the assignee of which is also the assignee of the present application, and the disclosure of which is incorporated herein by reference.

The nozzle 14 has a nozzle housing 16 which is attached to first telescope portion 18. The telescope portion 18 is slidable received within second telescope portion 20. Laser source 22, which preferably includes a continuous wave $CO_2$ laser with a power output of about 1.0 to about 5.0 kilowatts, radiates a beam 24. Naturally, the laser source 22 includes means for focusing the beam 24, and those skilled in the art will need no further explanation thereof.

Nozzle cone 26 is slidably received within aperture 28 of housing 16. The cone 26 has a central aperture 30 through which the beam 24 passes on its way to substrate 10. It can be noted that the housing 16 has an opening 32 to permit the beam 24 to pass therethrough.

Housing 16 includes an annular channel 34 disposed above perforated ring 36. The channel 34 communicates with powder supply duct 38 for conveying a quantity of cladding particles 40 to the nozzle 14. The particles 40 are transported through the duct 38 by a gas, preferably argon gas, so that the 713 alloy particles 40 are distributed about the channel 34 prior to flowing into chamber 42. Axial displacement of cone 26 regulates the gap between the cone 26 and the housing 16, and thereby regulates the flow of particles 40 from the nozzle 14.

A cooling ring 44 is mounted about the upper end of cone 26 and communicates with coolant supply duct 46 and with coolant exit duct 48 in order to remove generated heat from the cone 26.

The second telescope portion 20 includes an opening through which shrouding gas duct 50 communicates. The duct 50 serves as a source of supply for a shrouding gas, such as argon, which is used in the welding process. Although I have disclosed the use of argon for shrouding and for conveying the particles 40, those skilled in the art will understand that other gases are usable, depending upon the particular circumstance involved.

TABLE II

| | |
|---|---|
| Base Material Thickness = | 0.0625"–0.500" |
| Clad Deposit Thickness = | 0.005"–0.050" |
| Clad Deposit Track Width = | 0.050"–0.250" |
| Shroud Gas Flow Rate (Argon) = | 6–16 SCFH |
| Feed Gas Flow Rate (Argon) = | 2–4 SCFH |
| Powder Feed Rate = | 0.10–0.40 grams/second |
| Laser Power = | 1.0–5.0 Kilowatts |
| Travel Speed = | 10–100 inches/minute |
| Powder Particle Size = | −80/+325 mesh |

Table 2 discloses certain operating parameter ranges which I have found advantageous in welding Inconel 713C substrate with Inconel 713 particles. Naturally, there is no optimum set of parameters because the optimum processing parameters will depend, among other things, on the size of the clad deposit required. For example, the parameters for cladding a deposit 0.030 inches by 0.1875 inches would be different than for a clad deposit of 0.050 inches by 0.250 inches. Furthermore, the shroud and feed gas flow rate, the powder feed rate, and the powder particle size are somewhat variable, depending upon the powder feed mechanism chosen.

I believe that laser cladding of these precipitation hardenable alloys, with particles of like nominal composition, can be done without the previously noted cracking because of the lower and localized heat input which occurs through laser processing. The laser produces a very narrow heat affected zone. Furthermore, the molten pool, produced by the irradiation of the substrate and into which the particles 40 are dispersed, rapidly solidifies upon the beam being withdrawn. The result is, therefore, a smaller volume of material having passed more rapidly through the gamma-prime forming temperature region than was heretofore possible via conventional fusion welding techniques. In other words, a smaller fraction of gamma-prime is formed because the alloy in the molten pool is not maintained at the gamma-prime forming temperature for very long, the temperature change being quite dramatic and in the other of several thousand degrees or more per second.

It can be noted from Table 2 that the base material thickness (suitable thickness), is on the order of 10–12 times the thickness of the clad deposit. The result is that the mass of the substrate substantially exceeds the mass of the molten pool plus particles. The resulting mass differences cause the substrate to act as a heat sink which rapidly cools the pool, essentially as it is formed because of the rapid relative motion between the beam and the pool.

Preferably, the substrate 10 moves relative to the nozzle 14 in order to effect the relative motion between the substrate 10 and the beam 24 which is required for the rapid solidification to occur. The beam 24 irradiates a portion of the defect 12 and forms a molten pool comprised of the alloy of substrate 10. The particles 40 are then blown into the molten pool into which they become dispersed. The beam 24 is moved relative to the substrate 10 at a rapid speed in order to prevent excessive melting of the substrate 10, while assuring that a sufficient quantity of the alloy substrate is melted. Rapid motion, on the order of 10–100 inches per second, is generally sufficient to assure compliance with these two competing parameters.

While this invention has been described as having a preferred design, it is understood that it is capable of further modifications, uses and/or adaptations of the invention following in general the principle of the invention and including such departures from the present disclosure as come within known or customary practice in the art to which the invention pertains, and as may be applied to the central features herein before set forth, and fall within the scope of the invention of the limits of the appended claims.

What I claim is:

1. A process for preventing crack formation in nickel alloy substrates having a gamma-prime phase, comprising the steps of:
   (a) providing a substrate to be treated, said substrate comprising a nickel alloy having a gamma-prime phase;
   (b) exposing a portion of said substrate to a high power energy source and causing a molten pool of said alloy to be formed;
   (c) dispersing a supply of coating particles within said pool, said particles comprising a nickel alloy; and,
   (d) effecting rapid relative motion between said source and said pool so that said pool rapidly solidifies and thereby minimizes formation of gamma-prime therein and adjacent thereto.

2. The process of claim 1, including the step of:
   (a) providing a substrate comprised of a nickel alloy having gamma-prime forming constituents of a concentration less than 10.5% by weight.

3. The process of claim 1, including the step of:
   (a) providing particles comprised of a nickel alloy having gamma-prime forming constituents.

4. The process of claim 2, including the step of:
   (a) providing particles comprised of a nickel alloy having gamma-prime forming constituents of a concentration not exceeding 7.5% by weight.

5. The process of claim 1, including the step of:
   (a) providing a substrate comprised of an alloy having at least 60% by weight nickel.

6. The process of claim 1, including the steps of:
   (a) moving said beam relative to said pool at a speed of from about 10 to about 100 inches per minute; and,
   (b) shrouding said pool with an inert gas.

7. The process of claim 6, including the step of:

(a) providing particles comprised of a nickel alloy having a nominal chemical composition corresponding substantially with the nominal chemical composition of the nickel alloy of which said substrate is comprised.

8. A process for repairing the surface of a nickel alloy substrate having a gamma-prime phase, comprising the steps of:
    (a) providing a substrate having a surface defect, said substrate comprised of a first nickel alloy having a gamma-prime phase;
    (b) irradiating at least a portion of said defect with a laser beam and causing a molten pool of said alloy to be formed;
    (c) dispersing a supply of coating particles within said pool, said particles comprised of a second nickel alloy having gamma-prime forming constituents; and,
    (d) moving said beam relative to said pool so that said pool rapidly solidifies and thereby minimizes formation of gamma-prime therein and adjacent thereto.

9. The process of claim 8, including the step of:
    (a) forming a molten pool having a mass substantially less than the mass of said substrate.

10. The process of claim 9, including the steps of:
    (a) moving said beam relative to said pool at a speed from about 10 to about 100 inches per minute; and,
    (b) irradiating said defect with a laser beam having a power of from about 1.0 to about 5.0 kilowatts.

11. The process of claim 10, including the steps of:
    (a) pneumatically conveying said coating particles to said pool so that the particles thereby enter said pool and become dispersed therein; and,
    (b) shrouding said pool with an inert gas.

12. The process of claim 11, including the step of:
    (a) pneumatically conveying said particles with an inert gas, said conveying gas corresponding with said shrouding gas.

13. The process of claim 11, including the step of:
    (a) providing first and second nickel alloys having gamma-prime forming constituent concentrations not exceeding 7.5% by weight.

14. A process for coating a nickel alloy substrate having a gamma-prime phase, comprising the steps of:
    (a) providing a substrate comprised of a first nickel alloy having a gamma-prime phase;
    (b) focusing a laser beam on said substrate and irradiating a portion of said substrate and forming a molten pool of said first alloy, said pool having a mass substantially less than the mass of said substrate;
    (c) pneumatically conveying a supply of coating particles to said pool and thereby causing the particles to be introduced into and dispersed throughout said pool, said particles comprised of a second nickel alloy having gamma-prime forming constituents; and,
    (d) rapidly moving said beam relative to said pool so that said pool rapidly solidifies and thereby substantially minimizes formation of gamma-prime therein and adjacent thereto.

15. The process of claim 14, including the steps of:
    (a) providing coating particles having a mesh size of from about −80 to about +325; and,
    (b) shrouding said pool in an inert gas, the shrouding gas corresponding chemically with the conveying gas.

16. The process of claim 15, including the steps of:
    (a) providing a substrate having a thickness of from about 0.0625 to about 0.5 inches;
    (b) forming a molten pool having a depth of from about 0.005 to about 0.05 inches; and,
    (c) providing first and second nickel alloys having substantially corresponding nominal chemical composition.

17. The process of claim 16, including the steps of:
    (a) moving said beam relative to said pool at a speed from about 10 to about 100 inches per minute; and,
    (b) supplying particles at a rate of from about 0.10 to about 0.40 grams per second.

18. The process of claim 17, including the step of:
    (a) focusing said beam so that said beam has a diameter at said substrate of from about 0.050 to about 0.25 inches.

19. The process of claim 16, including the step of:
    (a) providing first and second alloys having gamma-prime forming constituents of a concentration not exceeding 7.5% by weight.

20. The process of claim 19, including the step of:
    (a) moving said beam relative to said pool as a function of the volume of said pool.

* * * * *